(12) United States Patent
Lethorn et al.

(10) Patent No.: US 9,068,611 B2
(45) Date of Patent: Jun. 30, 2015

(54) PIN CAP

(71) Applicant: AKEBONO BRAKE INDUSTRY CO., LTD., Chuo-ku, Tokyo (JP)

(72) Inventors: Brad Robert Lethorn, Northville, MI (US); Scott Alan Dubay, Clinton Township, MI (US)

(73) Assignee: AKEBONO BRAKE INDUSTRY CO., LTD., Chuo-Ku, Tokyo (JP)

( * ) Notice: Subject to any disclaimer, the term of this patent is extended or adjusted under 35 U.S.C. 154(b) by 47 days.

(21) Appl. No.: 14/070,656

(22) Filed: Nov. 4, 2013

(65) Prior Publication Data

US 2015/0122598 A1     May 7, 2015

(51) Int. Cl.
| | |
|---|---|
| *F16D 65/14* | (2006.01) |
| *F16D 65/00* | (2006.01) |
| *F16D 55/2265* | (2006.01) |
| *F16D 55/00* | (2006.01) |

(52) U.S. Cl.
CPC ...... *F16D 65/0087* (2013.01); *F16D 55/22655* (2013.01); *F16D 2055/007* (2013.01)

(58) Field of Classification Search
USPC .......................................... 188/73.44, 73.45
See application file for complete search history.

(56) References Cited

U.S. PATENT DOCUMENTS

| | | | |
|---|---|---|---|
| 3,942,611 A | 3/1976 | Burnett | |
| 4,060,154 A | 11/1977 | Smith | |
| 4,162,721 A | 7/1979 | Moriya | |
| 4,235,313 A | 11/1980 | Hirashita | |
| 4,244,451 A | 1/1981 | Johannesen | |
| 4,334,598 A | 6/1982 | Portolese | |
| 4,365,695 A | 12/1982 | Rath | |
| 4,401,194 A | 8/1983 | Klassen | |
| 4,447,066 A | 5/1984 | Katagiri et al. | |
| 4,512,446 A | 4/1985 | Chuwman et al. | |
| 4,574,922 A | 3/1986 | Varin et al. | |
| 4,762,206 A | 8/1988 | Arimitsu | |
| 4,781,273 A | 11/1988 | Fujinami | |
| 4,926,979 A | 5/1990 | Odaka | |
| 5,036,957 A | 8/1991 | Fouilleux et al. | |
| 5,111,914 A | 5/1992 | Thiel et al. | |
| 5,183,136 A | 2/1993 | Maeda et al. | |
| 5,217,093 A | 6/1993 | Carpenter | |
| 5,299,665 A | 4/1994 | Weiler et al. | |
| 5,927,446 A | 7/1999 | Evans | |
| 5,931,267 A | 8/1999 | Iwata et al. | |
| 6,112,864 A | 9/2000 | Suzuki et al. | |
| 6,336,524 B1 | 1/2002 | Van Loon et al. | |

(Continued)

FOREIGN PATENT DOCUMENTS

| | | |
|---|---|---|
| EP | 0510742 A1 | 3/1992 |
| JP | 08-2504 Y2 | 1/1996 |

*Primary Examiner* — Christopher Schwartz (74) *Attorney, Agent, or Firm* — The Dobrusin Law Firm, P.C.

(57) ABSTRACT

A pin cap comprising: (a) a central portion including one or more through holes; (b) one or more springing arms extending from the central portion; (c) one or more contact regions; and wherein the pin cap is configured to receive a pin from a brake system so that the one or more contact regions of the pin cap contact the pin and connect the pin cap to the pin, and the one or more through holes in the central portion assist the pin cap in expanding to receive a pin so that the central portion of the pin cap creates a gripping force on the pin; and wherein the one or more springing arms bias the pin so that the pin and pin cap are substantially centrally located within a pin bore of the brake system.

20 Claims, 6 Drawing Sheets

(56) References Cited

U.S. PATENT DOCUMENTS

| | | |
|---|---|---|
| 6,382,368 B2 | 5/2002 | Iwata et al. |
| 6,397,983 B1 | 6/2002 | Roszman et al. |
| 6,609,593 B2 | 8/2003 | Ishii et al. |
| 6,725,981 B1 * | 4/2004 | Franz .................. 188/73.45 |
| 7,958,976 B2 | 6/2011 | Morio et al. |
| 8,251,188 B2 | 8/2012 | Teper et al. |
| 2004/0188191 A1 | 9/2004 | Lintner |
| 2011/0284332 A1 * | 11/2011 | Champion et al. ......... 188/73.45 |
| 2014/0110198 A1 * | 4/2014 | Becker et al. ............. 188/73.44 |

* cited by examiner

PIN CAP

FIELD

The present teachings generally relate to one or more pin caps that are connected on a pin and specifically two pin caps that have a springing function for centering a pin within a pin bore.

BACKGROUND

The present teachings are predicated upon providing one or more improved pin caps for placement on a pin and for use in a disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, or the like. However, the present teachings are most suitable for use with a passenger vehicle (e.g., a car, truck, sports utility vehicle, or the like).

Generally, a braking system includes a rotor, a caliper body, two or more pins, a support bracket, an inboard brake pad, and an outboard brake pad that are on opposing sides of the rotor. The caliper body further includes one or more fingers, one or more piston bores, and a bridge that connects the one or more fingers to the piston bore or two opposing piston bores together. The piston bore houses a piston. The piston bore has a bore axis that the piston moves along during a brake apply and a brake retract. The piston bore may include a fluid inlet, a closed wall, a front opening, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad that generally includes a pressure plate and friction material and the friction material will contact the rotor on one side and the caliper will slide a pin until the opposing brake pad contacts the rotor on an opposing side creating friction to stop rotation of the rotor and any component connected to the brake system. Alternatively, in a system with opposing pistons the caliper is supported by pins and the opposing pistons move opposing brake pads simultaneously into contact with the opposing sides of the rotor. The pin extends into a pin bore in the caliper, the support bracket, or both and during a braking event the pin moves within the pin bore so that the brake pads, the caliper, or both may not be normal to the rotor, the support bracket, or both. Attempts have been made to bias the pin, however, there remains a need for a device that aligns the pins within a pin bore during running, a braking event, or both.

Examples of braking systems that include a pin and/or a device to bias a pin may be disclosed in U.S. Pat. Nos. 4,060,154; 4,235,313; 4,334,598; 4,401,194; 4,447,066; 4,574,922; 4,762,206; 4,781,273; 4,926,979; 5,036,957; 5,183,136; 5,299,665; 5,927,446; 5,931,267; and 6,725,981; U.S. Patent Application Publication No. 2004/0188191; European Patent No. EP0510742; and Japanese Patent No. JP08002504 all of which are expressly incorporated herein by reference for all purposes. It would be attractive to have a device that biases a pin within a pin bore so that the pin is aligned within the pin bore. It would be attractive to have a device that connects to a pin and retains the pin within a pin bore so that the pin is moveable without lubricant, the device is free of derogation, free of loss of restitution, or a combination thereof. What is needed is a device that maintains a pin within a pin bore so that the pin is substantially free of movement within the pin bore during running such that the pin is free of rattle within the pin bore.

SUMMARY

One possible embodiment of the present teachings include: a pin cap comprising: (a) a central portion including one or more through holes; (b) one or more springing arms extending from the central portion; (c) one or more contact regions; and wherein the pin cap is configured to receive a pin from a brake system so that the one or more contact regions of the pin cap contact the pin and connect the pin cap to the pin, and the one or more through holes in the central portion assist the pin cap in expanding to receive a pin so that the central portion of the pin cap creates a gripping force on the pin; and wherein the one or more springing arms bias the pin so that the pin and pin cap are substantially centrally located within a pin bore of the brake system.

Another possible embodiment of the present teachings provides a pin including an end cap of the teachings herein on an end of the pin and a bushing cap of the teachings herein on an opposing end of the pin, wherein the end pin and the bushing pin are configured so that the pin is centrally located within a pin bore of a brake system before, during, and after a braking event.

One possible embodiment of the present teachings include: a brake system comprising: (a) a brake component having one or more pin bores; (b) a pin that extends into each of the one or more pin bores; and (c) one or more pin caps on each of the pins, the one or more pin caps comprising: (i) a central portion having one or more through holes; (ii) one or more springing arms extending from the central portion; (iii) one or more contact regions; and wherein the pin cap is configured to receive the pin so that the one or more contact regions of the pin cap contact the pin and connect the pin cap to the pin, and the one or more through holes in the central portion assist the pin cap in expanding to receive a pin so that the central portion of the pin cap creates a gripping force on the pin; and wherein the one or more spring pins bias the pin so that the pin and pin cap are substantially centrally located within the pin bore.

The present teachings provide a device that biases a pin within a pin bore so that the pin is aligned within the pin bore. The teachings herein provide a device that connects to a pin and retains the pin within a pin bore so that the pin is moveable without lubricant, the device is free of derogation, free of loss of restitution, or a combination thereof. The present teachings provide a device that maintains a pin within a pin bore so that the pin is substantially free of movement within the pin bore during running such that the pin is free of rattle within the pin bore.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a brake system that may be used to create a braking force. The brake system may be any brake system that when installed in a vehicle creates a braking force. The brake system may include one or more pins that one or more brake pads, a caliper, or both move along to create a brake force. The brake system may include one or more pistons. The brake system may include opposing pistons. Preferably, the brake system includes one or more pistons on one side of a rotor so that when the piston moves a brake pad into contact with a rotor the caliper moves until an fingers move an opposing brake pad into contact with an opposing side of the rotor.

The caliper may be any caliper that assists in creating a friction force during a brake apply. The caliper may be any caliper that includes one or more pistons that move during a brake apply to create a friction force. The caliper may include one or pistons on each side of the caliper so that the caliper is substantially static during a brake apply. Preferably, the caliper includes one or more pistons only on one side and the piston moves the caliper during a brake apply. The caliper may be connected in a brake system via one or more, preferably two or more, or even three or more pins. The pins may form a fixed connection with the support bracket, the caliper, or both. The pins may extend through the caliper and be fixedly connected to the caliper. The pins may be threaded and may be threaded into the support bracket so that a fixed connection is formed. (i.e., the caliper is directly connected to the pins and indirectly connected to the support bracket via the pins). Preferably, the pins form a threaded connection with the caliper and the caliper is fixedly connected to the pin at a location proximate a head of the pin so that the caliper is retained on the pins (i.e., the caliper is directly connected to the pins). The caliper may be connected in the brake system via one or more cantilever pins. Preferably, the caliper is connected to a support bracket via two or more pins so that the caliper moves along and/or with the pins during a braking event (e.g., brake apply and subsequent brake retract) so that a braking force is created. Preferably, the caliper is static relative to the pins during a braking event. For example, the pins may be axially movable within a pin bore and the caliper may move with the pins such that the relationship of the pins and the caliper does not change during the braking event.

The support bracket may be any device that connects the brake system to a corner module (e.g., a knuckle). The support bracket may be any static part of the brake system. The support bracket may directly and/or indirectly support the brake pads. Preferably, the support bracket includes at least two opposing abutments that guide the brake pads during a brake apply and retain the brake pads within the support bracket during non-braking conditions (e.g., running). The caliper and the support bracket may be one unitary piece. Preferably, the support bracket and caliper may be two discrete pieces. The support bracket may connect the caliper indirectly to a corner module. The support bracket may provide support to the caliper so that the caliper moves during a brake apply. The support bracket may be sized so that the caliper extends on both sides of the support bracket and a rotor extends through a center of the support bracket. The support bracket may include one or more pin bores, preferably two or more pin bores, or even three or more pin bores. Preferably, when two or more pin bores are present the pin bores are on opposing ends of the support bracket.

The one or more pin bores may be any device that receives the one or more pins. The one or more pin bores may be any recess, through hole, partial hole, or a combination thereof in the support bracket that receives the one or more pins. The one or more pin bores may be substantially the same size as the pins. The one or more pin bores may be larger than the pins so that the pins may move within the pin bores. The one or more pin bores may have a diameter that is substantially the same as the pins so that the pins are prevented from moving in lateral direction, a radial direction, or both relative to an axis of the pin. The pin bores may have a length that is substantially the same as that of the pin so that axial movement of the pin is limited by the length of the pin bore. Preferably, the pin bore is longer than the pin so that the pin may axially move within the pin bore. However, longitudinal movement may be limited by the fastened connection between the pin and the support bracket, a pin cap, a bushing, the caliper, or a combination thereof. Preferably, the one or more pin bores may be free of threads so that the pin and the pin bores are free of a fixed connection, so that the pin may freely move within the pin bore, or both. The one or more pin bores may include one or more connection features for connecting the pin to and/or within the pin bore. Preferably, the one or more pin bores may be free of connection features to receive a pin and form a connection with the pin (e.g., threads, pin, set screw, etc.).

The pin may be any device that connects a caliper and a support bracket together. The pin may be fixedly connected to a support bracket, a caliper, or both. Preferably, the pin is only fixedly connected to a caliper so that the caliper is movably connected to the support bracket via a connection with the pin. The pin may be any device that allows the caliper, the brake pads, or both to move within the brake system so that a braking force may be created. The pin may be fixedly connected to the support bracket so that the caliper moves along the pin. Preferably, the pin may be connected to the caliper so that the caliper and the pin do not move relative to each other, are free of movement relative to each other, or both. The pin may be substantially axially static relative to its axis, laterally static within a pin bore relative to its axis, or both. Preferably, the pin may move within a pin bore so that the pin moves relative to the support bracket. More preferably, the pin when connected to one or more pin caps of the teachings herein remain axially static after a braking event. The pin may have a continuous wall. The wall of the pin may be the same size and shape the entire axial length of the pin. The wall of the pin may step down towards an end region, a tip, or both. The wall of the pin may be substantially planar the entire axial length of the pin, the wall of the pin may taper along the axial length of the pin, the pin may step down one or more times along the axial length of the pin, or a combination of both. The pin may include connection features in a region proximate to the head (i.e., the side outside of the pin bore, proximate to the caliper, or both), may be free of connection features in a region distal from the head, may be free of connection features on a portion of the pin that extends into a pin bore, may include connection features on a portion that extends into the pin bore, or a combination thereof. The connection feature may be any feature that fixedly connects the pin to a caliper, a support bracket, a bushing, or a combination thereof. The connection feature may be threads, a raised portion, a recess, a hole and a pin, the like, or a combination thereof. The pin may be any device that extends through and/or into a caliper, a bushing, a support bracket, or a combination thereof.

The one or more bushings may be any device that prevents contaminants, debris, or both from entering a pin bore, contaminating a lubricant within the pin bore, entering a bore in the caliper, contaminating a surface of the pin, or a combination thereof. The one or more bushings may cover a region proximate to a head of the pin; a region between a head region of the pin and the caliper; a region between the support bracket and the caliper; or a combination thereof. The one or more bushings may move with the caliper during a braking event, between braking events, or both. The one or more bushings may connect to one or more pin caps.

The one or more pin caps may be any device that is connected to the one or more pins and assists in biasing the one or more pins, maintaining a position of the one or more pins, maintaining a position of the caliper, or a combination thereof. The one or more pin caps may extend substantially around an outside of a pin. The one or more pin caps may receive a portion of the pin so that the pin is surrounded on all sides by the pin cap. The one or more pin caps may move with the pin, may be static and the pin may move within the pin cap, or both. Preferably, when more than one pin cap is present one pin cap may move with the pin and one pin cap may be static and the pin may move relative to the pin cap. The one or more pin caps may be any device that may locate the one or more pins within the one or more pin bores. The one or more pin caps may provide lateral alignment (e.g., may move the pin in a direction perpendicular to the axis of the pin) of the pin within the pin bore. The one or more pin caps may bias the one or more pins so that the pins support the caliper such that an axis of the caliper, a plane of the caliper bridge, a plane that the caliper bridge moves along, or a combination thereof is maintained substantially normal to the axis of the rotor.

The one or more pin caps may prevent axial movement of the pin, the caliper, the brake pads, or a combination thereof during a non-braking condition. For example, the pin cap may provide a sufficient force on the walls of the pin bore so that any force, other than a force generated by contact with the rotor or movement of the caliper is not sufficient to overcome the static force of the end cap on the walls of the pin bore. In another example, once a brake apply is complete, the brake pads may move away from the rotor and as the rotor begins to rotate, a high spot on the rotor, a warped portion of the rotor, or both may move the brake pads apart as the rotor moves though the brake pads and the pin caps may be free of a reactionary force that returns the pin towards the previous position (i.e., the pin cap retains the pin at the location once a force is complete and does not generate a force that moves the caliper). The high spot, rotor wobble, or both may set the size of the air gap and the one or more pin caps may maintain the size of the air gap (e.g., the movement of the system may be analogous to plastic deformation). During running, movement of the vehicle, vibrations, the like, or a combination thereof may cause the caliper to move so that the brake pads are moved past the air gap and into contact with the rotor; however, the pin caps may have a low coefficient of friction with the pin bore so that static friction of the caliper is overcome easily so that the caliper moves axially due to the contact. Further, once the contact ceases and the air gap is created again, the pin caps assist in maintaining the pins substantially in the position as set so that contact between the brake pads and rotor is prevented by a reactionary movement of the pin cap. During movement of the component that the brake system is installed (e.g., a vehicle) one or more forces (e.g., radial force, lateral force, or both) may move the pin towards a wall of the pin bore and the one or more end caps may provide a reactionary force so that the pin is prevented from contacting the pin bore, contact between the pin and pin bore is incidental, contact between the pin and the pin bore is minimized so that the contact is substantially free of sound, or a combination thereof. The one or more pin caps may substantially prevent vibrations and/or sudden movements from causing the pin to contact the pin bore. For example, vibrations caused by a road surface that is not substantially flat may cause rapid movements of the caliper so that the pin is moved at an angle relative to the longitudinal axis of the pin and the one or more pin caps may counteract this movement so that any contact between the pin and the pin bore is incidental. The pin cap may create a sufficient amount of force so that the pin cap substantially maintains the pin, the caliper, or both in a static position, with an air gap, out of contact with the pin bore, or a combination thereof during running. The one or more pin caps may assist in maintaining a substantially constant air gap along a surface of the brake pads (e.g., length and width). The one or more pin caps may assist in reducing and/or eliminating lateral run out (LRO) by maintaining a set position of the caliper, brake pads, or both and preventing reversion of the caliper, the brake pads, or both into contact with the rotor during running. For example, once the caliper is moved to a position such that an air gap exists between the brake pads and rotor the pin cap will not retain any energy that changes the position of the caliper, the brake pads, or both so that the size of the air gap is reduced. Thus, when the pin and pin caps are moved to a specific position the pin caps do not generate any forces along the axial direction and the pin caps do not move the pin along its longitudinal axis. Stated another way, the one or more pin caps may be axially neutral in force so that the one or more pin caps do not generate any biasing forces along the axis of the pin. The pin caps may maintain the brake pads, the caliper, the pins, or a combination thereof substantially axially static during running so that air gap is not reduced, air gap is not eliminated, contact between the brake pads and the rotor is reduced and/or eliminated, or a combination thereof. However, any contact generated between the rotor and the brake pads may easily overcome the static friction between the one or more pin caps and the one or more pin bores so that the brake pads are moved out of contact with the rotor, a size of the air gap is increased, or both. The one or more pin caps may prevent axial movement, may not generate axial movement, or both (i.e., provide axial stiffness).

The one or more pin caps may assist the pins in maintaining axial stiffness so that the caliper is aligned normal to the rotor and the brake pads maintain a substantially constant air gap (e.g., about 10 mm or less, about 5 mm or less, preferably about 1 mm or more, or more preferably about 2 mm or more) along a width of the brake pad. For example, when measuring the air gap between the rotor and the top of a brake pad and the rotor and a bottom of the brake pad, the air gap is substantially the same at both locations. Air gap as discussed herein may be the total distance between the face of the inboard brake pad and the face of the outboard brake pad minus the thickness of the rotor, when the inboard brake pad contacts the piston and the outboard brake pad contacts the fingers. To state it another way, air gap may be the distance between the face of the rotor on the outboard side and the face of the outboard brake pad when the inboard brake pad is pushed into contact with the face of the rotor on the inboard side and when the inboard brake pad contacts the piston and the outboard brake pad contacts the fingers. The one or more pin caps may separate a pin from a wall of a pin bore, may maintain substantially a constant gap between the pin and the walls of the pin bore, may form a contact medium between the walls of the pin bore and the pin, or a combination thereof.

The pin cap may bias any portion of the pin so that movement of the pin at an angle relative to the pin bore is inhibited, prevented, minimized, or both. Preferably, the pin cap biases one or both end regions of the pin within the pin bore so that the pin is substantially prevented from contacting a wall of the pin bore. More preferably, the pin cap maintains a position of the pin centrally within the pin bore and maintains the pin substantially static once an air gap is established after a brake apply so that the pin is free of any movement reducing air gap. The one or more pin caps may be any device that separates the pin from the pin bore so that during maintenance of the brake system, changing of brake pads and/or a rotor, removal of the pins, a first movement of the pins after an extended rest (e.g., 12 hours or more or even 24 hours or more), or a combination thereof the pin caps assist in movement and/or removal of the pins, prevent the pins and pin bores from being connected, the pin caps are free of a semi-fixed connection (i.e., a connection where a force to a pin within the pin bore is substantially increased (e.g., the force required to overcome static friction and move the pin is about two times or more or about three times or more when compared to that of a non-extended rest) with the pin bore, or both. The one or more pin caps may bias an end of a pin (i.e., an end cap); the one or more pin caps may bias a portion of a pin proximate to a bushing, an open end of a pin bore, a connection between a pin and a pin bore, or a combination thereof (i.e., bushing cap); or both. The one or more pin caps may bias the pin so that the pin is free of contact with the pin bore, so that rattle is reduced and/or eliminated, so that the pin is centered in the pin bore, the pin is maintained axially static, or a combination thereof. The one or more pin caps when present in the system may reduce sound produced by the brake system.

The one or more pin caps may reduce noise of the brake system by dampening movement of the pins within the pin bore so that contact between the pin and the pin bore is substantially reduced and/or eliminated (e.g., rattle is reduced and/or eliminated). The one or more pin caps may reduce noise by slowing movement of the pin towards the pin bore, preventing contact between the pin and the pin bore, or both. The brake system including one or more pin caps and preferably two pin caps may produce a noise of about 20 sane or less, about 15 sone or less, preferably about 10 sone or less, or more preferably about 8 sone or less, or even more preferably about 5 sone or less. For example, contact between a pin and a pin bore, a pin cap and the pin bore, or a combination of both may produce a sound as discussed herein such that the sound is 10 sone or less. The sound produced (i.e., noise, vibration, or harshness (NVH) of the brake system) at the point of contact between the pin, pin bore, pin cap, or a combination thereof may be about 62 decibels or less, about 60 decibels or less, about 58 decibels or less, about 56 decibels or less, or about 54 decibels or less.

The one or more pin caps may be made of any material that may elastically deform. The one or more pin caps may be made of any material that creates a reactionary force, a gripping force or both. The one or more pin caps may be made of metal, plastic, a polymer, a ceramic, a natural material, a synthetic material, or a combination thereof. Preferably, the one or more pin caps are made of iron, stainless steel, steel, or a combination thereof. The one or more pin caps may include a coating.

The coatings may cover any portion of the pin cap. The coatings may cover all or a portion of the pin cap. The coating may be any coating that allows the pin cap to move relative to the piston bore; to prevent the pin bore from being adhered to the pin, the pin bore, or both; to be removed from the pin bore; or a combination thereof. The coating may be any coating that reduces friction between the pin cap and the pin bore; prevents the pin cap from bonding to the pin, the pin bore, or both due to oxidation; or a combination of both. The coating may be polytetrafluoroethylene, anodized aluminum, a ceramic coating, or a combination thereof. The coating may be on any part of the one or more pin caps. Preferably, the coating is on any part of the pin cap that contacts an adjacent surface. More preferably, the coating is on the contact regions of the springing arms. The one or more pin caps (e.g., end cap or bushing cap) may include one or more springing arms, one or more contact regions, one or more deformation regions, one or more central regions, or a combination thereof.

The one or more springing arms may be any arm that extends toward a wall of the pin bore, away from the pin, or both. The one or more springing arms may extend into contact with a wall of the pin bore so that during movement of the pin, the springing arm creates a reactive force against a wall of the pin bore so that the pin is maintained within a central portion (e.g., in a middle portion of the pin bore so that the pin is free of contact with the walls of the pin bore on all sides) of the pin bore, the pin and caliper are biased, or both. The one or more springing arms may prevent the pin from contacting a wall of the pin bore, reduce the acceleration of the pin towards the pin bore, dampen the frequency of pin movements within the pin bore (i.e., from side to side), or a combination thereof. The one or more springing arms may prevent rattle of the pin by preventing the pin from contacting walls of the pin bore. The one or more springing arms may be connected on both ends. The one or more springing arms may be cantilever. The one or more springing arms may taper as the springing arms extend away from a central portion. The one or more springing arms may be the same width and thickness along their length. The one or more springing arms may taper and then widen. The one or more springing arms may form any shape so that the springing arms bias the pins within the pin bore. The one or more springing arms may be thin and then flare out. The one or more springing arms may be "T-shaped"; "L-Shaped"; may be shaped so that a spade shape, an arrow shape, a triangle shape, or a combination thereof is formed between two adjacent springing arms; or a combination thereof. The one or more springing arms may extend at an angle relative to the pin, a central portion of the end cap, or both.

The angle that the springing arms extend from a central portion may be any angle so that the springing arms provide a reactive force and align the pin within the pin bore. The angle may be any angle so that the springing arms produce a reactive force that inhibits movement of the pin towards the pin bore. The angle may be any angle so that the springing arms extend away from the pin. A portion of the springing arms may extend away from the pin and a portion of the springing arms may extend towards the pin. The angle may be any angle so that a distance (i.e., space) between the springing arm and the pin increase as the springing arm extends away from a central portion. The angle may be about 10 degrees or more, about 15 degrees more, about 20 degrees or more, or about 25 degrees or more. The angle may be about 75 degrees or less, about 60 degrees or less, or about 45 degrees or less. The angles as discussed herein are absolute (i.e., extending towards the pin bore and away from the pin bore are both recited as positive angles). The angle may be sufficiently large so that the springing arm may be compressed and the pin is prevented from contacting a wall of the pin bore. The angle of the springing arms may be sufficiently large so that the springing arms produce a sufficient force so that the pin is prevented from contacting a wall of the pin bore. The angle of the springing arms may generate a space between the springing arm and a wall of the pin. The one or more springing arms and the pin may be separated by a space.

The space may be any space so that the springing arms extend into contact with a wall of a pin bore, proximate to a wall of a pin bore, or both. The space may be at its maximum at an end of the springing arms, at an end of the springing arm opposite the central portion, or both. The distance of the space at the maximum distance between the pin and the springing arm may be about 0.1 mm or more, about 0.5 mm or more, about 1 mm or more, or about 2 mm or more. The distance of the space at the maximum distance between the pin and the springing arm may be about 10 mm or less, about 8 mm or less, or about 5 mm or less. The space may be sufficiently large so that a force of the springing arms prevents the pin from contacting the pin wall during a braking event.

The force of the springing arms may be any force so that the springing arms substantially maintain the pin in a center of the pin bore, the pins provide axial stiffness to the caliper, rattle is substantially reduced and/or eliminated, contact between the pin and a wall of the pin bore is eliminated, the springing arm overcomes the force of the pin towards a wall of the pin bore, or a combination thereof. Preferably, the forces generated by the springing arms are at an angle relative to the longitudinal axis of the pin. More preferably, the springing arms do not generate a force along the longitudinal axis of the pin and the force generated by the springing arms is substantially perpendicular to the longitudinal axis of the pin. The force of each of the springing arms at an angle relative to the longitudinal axis of the pin may be about 5 N or more, about 10 N or more, about 15 N or more, about 20 N or more, or even about 25 N or more. The force of the springing arms at an angle relative to the longitudinal axis of the pin may be about 50 N or less, about 40 N or less, or about 30 N or less. The force of the springing arms along the longitudinal axis of the pin may be about 1 N or less, about 0.5 N or less, or preferably substantially 0 N. Preferably, the one or more springing arms are cantilever and extend laterally away from a central portion as the springing arms extend axially away from the central portion.

The one or more springing arms may be a plurality of springing arms that extend around a circumference of a pin. The springing arms may be elastically deformable so that the springing arms produce the force discussed herein, provide axial stiffness to the caliper, or both. The pin cap may include a sufficient number of springing arms so that the pin cap provides an axial stiffness to the caliper, the brake system, or both; provides a reactionary force; biases the pin; maintains the pin substantially in a center of the pin bore; or a combination thereof. The pin cap may include about 2 or more, 3 or more, 4 or more, 5 or more, or even 6 or more springing arms around a circumference of the pin. When more than one springing arm is present the springing arms may be uniform in size and shape (e.g., if 4 springing arms are present each springing arm may extend along an arc that is about 75 degrees in length). The two or more springing arms may have a different size and shape (e.g., if 3 springing arms are present 1 springing arm may extend along an arc that is 120 degrees and two springing arms may extend along an arc that is 75 degrees). Preferably, the plurality of springing arms are evenly sized and spaced around the pin so that equal force is applied to all sides of the pin. For example, the arc of each of the springing arms may be calculated by the following formula $(360-(dr*n))/n$, where dr is the length of the deformation regions in degrees and n is the number of springing arms. The arc as discussed herein is the distance the springing arms extend when measured at the connection region. A central portion may be located proximate to the connection regions. Preferably, the contact regions are located on an opposing end of the springing arms as the central portion.

The contact regions may be any region of the pin caps that contact the walls of the pin bore, the pin, or both. The contact regions may be located at any location on the pin cap that extends into contact with the walls of the pin bore, into contact with the pin, or both. Preferably, the contact regions of the pin caps are located on the springing arms. The springing arms may extend outward into contact with a wall of a pin bore, inward into contact with a pin, or a combination of both. Preferably, a tip of a springing arm includes a contact region so that the springing arm produces a bias force to bias a pin relative to a wall of the pin bore. The tip of the springing arm may extend down into contact with a pin and then outward away from the pin towards the pin bore so that the tip of the springing arm includes two contact regions. For example, the tip of the springing arm may be shaped like a ski jump. The tip of the springing arm may be the only location where the pin cap contacts the pin, the pin bore, or both. The contact regions may be continuously in contact with an adjacent component (e.g., a pin or a pin bore), may be intermittently in contact with an adjacent component (e.g., moved into contact during a braking event and out of contact during running), or a combination of both. The contact regions may prevent the remainder of the pin cap from contacting the pin, the pin bore, or both. The contact regions may form a pivot point, a fulcrum, or both. The contact regions when in contact with the pin may grip the pin so that the pin cap is connected to the pin at the contact regions. The contact regions preferably are located on the ends of the springing arms so that the springing arms produce a bias force. However, the contact regions may be located in a central portion of the pin cap.

The central portion of the pin cap may be any portion from which one or more other components of the pin cap extend. One or more bushing arms, one or more gripping arms, one or more springing arms, or a combination thereof may extend from the central portion. The central portion may be any part of the pin cap that one or more and preferably a plurality of springing arms extend. The central portion may combine one or more components together so that the end cap is formed. The central portion may provide axial stiffness to one or more parts of the end cap. The central portion may form a connection point for one or more cantilever components (e.g., a springing arm). The central portion may include one or more through holes and preferably one through hole extending there through. The central portion may provide a connection point for the springing arms so that deformation regions are located between each of the springing arms.

The one or more deformation regions may be any region were material is removed, absent, thinned, or a combination thereof so that one or more springing arms, one or more bushing arms, one or more gripping arms, or a combination thereof bias, apply a reactionary force, are movable, or a combination thereof. The one or more deformation regions may extend between two or more springing arms, two or more bushing arms, two or more gripping arms, or a combination thereof. Preferably, the deformation regions and the springing arms have an alternating relationship. The one or more deformation regions may have any shape so that the deformation regions assist the respective arm (e.g., one or more springing arms, one or more bushing arms, one or more gripping arms, or a combination thereof) in being deformed during a braking event so that the respective arm applies a bias force to the pin and maintains the pin within the pin bore. The one or more deformation regions may be linear, may be arcuate, may have a spade shape, may be symmetrical when compared along a centerline that extends parallel to an axis of the pin, may be asymmetrical when compared along a centerline that extends parallel to an axis of the pin, may taper so that a width decreases, may taper so that a width increases, or a combination thereof. The size and shape of the deformation regions may be sufficient so that the one or more respective arms exhibit the forces discussed herein. The size and shape of the deformation regions may vary based upon the size of the pin, the number of pins in the brake system, the size of the caliper, the length of the pin, the number of pin caps, the number of springing arms, or a combination thereof. The deformation regions may be a window in one or more of the respective arms.

The windows may be any through hole that extends through one or more of the respective arms. The respective arms (e.g., bushing arm, springing arm, or gripping arm) may be free of windows. Preferably, the windows extend through the springing arms. The windows may be an absence of material in one of the respective arms that varies the force the arm applies against a wall of a pin, a wall of a pin bore, or both. Preferably, windows are present in springing arms of a bushing cap. The one or more windows may vary the force of the one or more springing arms so that a desired force may be selected. Preferably, windows are not located in a bushing arm.

The bushing arm may be any arm that connects the pin cap to a bushing. The bushing arm may connect to a bushing so that the bushing is moved with the pin, the pin cap, the caliper, or a combination thereof during a braking event. The bushing arm may extend into, connect to, be surrounded by, surround, or a combination thereof the bushing so that the bushing and the bushing arm are integrally connected. The bushing arm may be a flange that radially extends from a central portion of the pin cap and preferably a bushing cap. The bushing arm may be larger than the pin bore so that the bushing, the pin cap, the bushing cap, or both do not extend into the pin bore, do not completely extend into the pin bore, or both. For example, a bushing cap may partially extend into the pin bore and the bushing arm may prevent the bushing cap from extending further into the pin bore. The bushing arm may be generally smooth, may include recesses, may include connection ports, may include connection arms, or a combination thereof for connecting the pin cap to a bushing. The bushing arm may extend substantially at a right angle to a central portion, at an obtuse angle relative to the central portion, at an acute angle relative to the central portion, or a combination thereof. Preferably, the bushing arm extends at a right angle relative to a central portion. The bushing arm may be located distal from an end region of the pin. Preferably, the bushing arm is located outside of the pin bore and the end regions of the pin are a part of the pin that is located the farthest into the pin bore. The bushing arm may be part of a pin cap that is not connected to an end region of the pin.

The end regions of the pin may be any part of the pin that extends deepest into the pin bore. The end region of the pin may be a tip of the pin, a cantilever end of the pin, or both. The end region may be a portion of the pin with the largest movement during a brake event. For example, if an end of the pin in contact with the caliper moves 1 mm the end region may move 2 mm. The end regions of the pin may be in contact with a pin cap, a gripping arm of a pin cap, or both.

The gripping arms may be any arm that connects a pin cap to a pin. The gripping arms may be any arm that extends into contact with a pin and connects a pin cap to a pin. The gripping arms may be discrete arms from the other respective arms (e.g., springing arms, bushing arms, or both). The gripping arms and the springing arms may be the same arm. Preferably, the gripping arms and the springing arms are different arms on and end cap and the same arms on a bushing cap. The gripping arms may grip an end region of a pin, a tip of a pin, or both. The gripping arms may allow the pin cap to flex so that the pin may be inserted into the pin cap and then contract to grip the pin so that the pin and pin cap are connected. The gripping arms may allow the pin cap to flex so that a pin may be press fit into the pin cap. The gripping arms may extend from a central portion and the central portion may contact the pin and the central portion may form an interference fit with the pin. The gripping arms may be symmetrically located around the pin cap so that the pin is evenly gripped by the gripping arms. The gripping arms may be "U-shaped," "V-shaped," linear, step shaped, or a combination thereof. The gripping arms may prevent a pin from extending all of the way through the pin cap, through a through hole in the pin cap, or both. The gripping arms may be configured so that the pin extends through the gripping arms. The gripping arms may be elastically deformable so that the gripping arms produce a gripping force. The gripping arms may create a sufficient amount of force on the pin so that the pin cap is retained on the pin during a braking event. The gripping arms may each create a force of about 5 N or more, about 10 N or more, or about 15 N or more on the pin. The gripping arms may be separated by a gripping region that allows the gripping arms to move relative to each other to create a gripping force.

The gripping region may be any region between gripping arms that assist the gripping arms in creating a gripping force. The gripping regions are any region between the gripping arms that allow the gripping arms to move relative to each other. The gripping regions may be a lack of material, an absence of material, a space, or a combination thereof between the gripping arms. The gripping region may be located at a very front portion of the pin cap so that the pin cap is connectable to a tip of a pin. The gripping region may be any shape and size so that the gripping arms are movable to create a gripping force. The gripping region may be cross shaped, circular, a line, two intersecting lines, or a combination thereof. The gripping region may be a through hole that the pin extends through. Preferably, if the pin cap is an end cap the gripping region is not a through hole and if the pin cap is a bushing cap the gripping region is a through hole.

A through hole may be any part of a pin cap where an object may be passed through. For example, a lubricant may enter a pin cap through a through hole. A through hole may be any part of the pin cap that the pin extends through. The through hole may be any part of the pin cap so that the pin is located on both sides of the pin cap. The through hole may be an absence of material so that the pin extends through the pin cap so that the pin cap retains the pin and biases the pin during a braking event. The through hole may be absent from an end cap and be present in a bushing cap.

The end cap may be any pin cap that connected to a tip of a pin, an end region of a pin, or both. The end cap may entirely extend into a pin bore so that the end cap is completely surrounded by the pin bore. The end cap may be movable with the pin. The end cap may be static relative to the pin when the pin is moved. The end cap may be free of bushing arms, windows, or both. Preferably, the end cap includes gripping arms and springing arms as discussed herein. The end cap may include springing arms that extend on first side of the central portion gripping arms that extend on a second side of the central portion. The end cap may include about four springing arms and about four gripping arms, however, as discussed herein there may be more or less of each of the respective arms. The end cap may include a through hole that extends through the end cap. The end cap may be generally thimble shaped. The end cap may be located on an opposite end of a pin than the bushing cap.

The bushing cap may be any pin cap that connects to a pin at a region proximate to the caliper, the open end of the pin bore, a bushing, or a combination thereof. The bushing cap may be axially movable. Preferably, the bushing cap is axially static and the pin moves through the bushing cap. The bushing cap may move laterally with the pin but be axially static. The bushing cap may be free of movement relative the pin (i.e., the bushing cap remains static and the pin moves). The bushing cap may include one or more springing arms and one or more bushing arms. The bushing cap may include a through hole so that the pin extends through the bushing cap. A portion of the bushing cap may be located inside of the pin bore and a portion of the bushing cap may be located outside of the pin bore. The bushing cap may connect to a bushing. The bushing, cap may include a springing arm that acts as both a bias member against the pin bore and a bias member to retain the pin within the bushing cap.

Figure 1A:
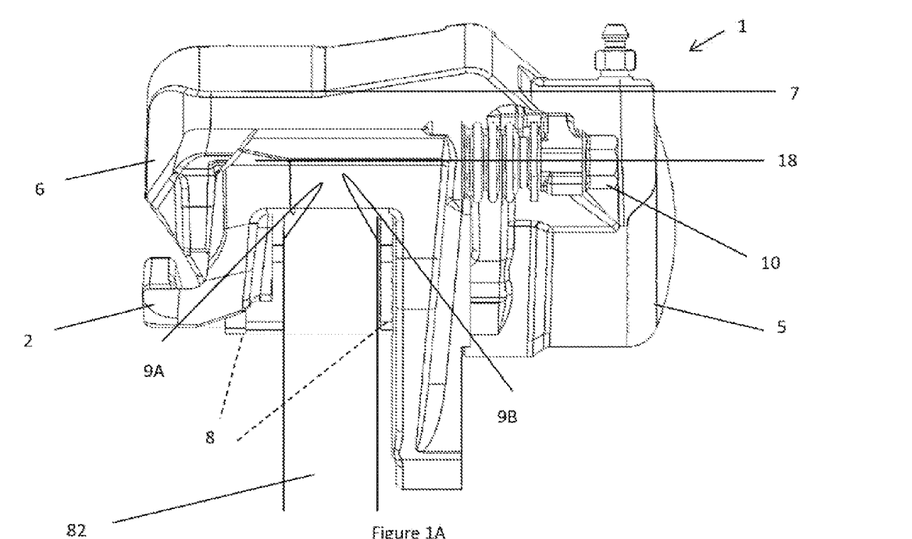
FIG. 1A illustrates a side view of a brake system during a brake apply.

FIG. 1A illustrates a brake system 1 during a brake apply. The brake system 1 as illustrated includes a caliper 6 connected to a support bracket 2 via a pin 10 with a pair of brake pads 8 located within the caliper 6. The pin 10 extends into a pin bore 4 (not shown). The pin 10 includes a pin axis 18 and the caliper 6 includes a plane 7 that the caliper 6 moves along during a braking event. The caliper 6 moves along the pin axis 18 with the pin axis 18 being substantially parallel to the plane 7 so that the faces of the brake pads 8 substantially parallel when they come into contact with the rotor 82. The faces of the brake pads 9A and 9B as shown are in contact with a rotor 82 so that a braking force is created.

Figure 1B:
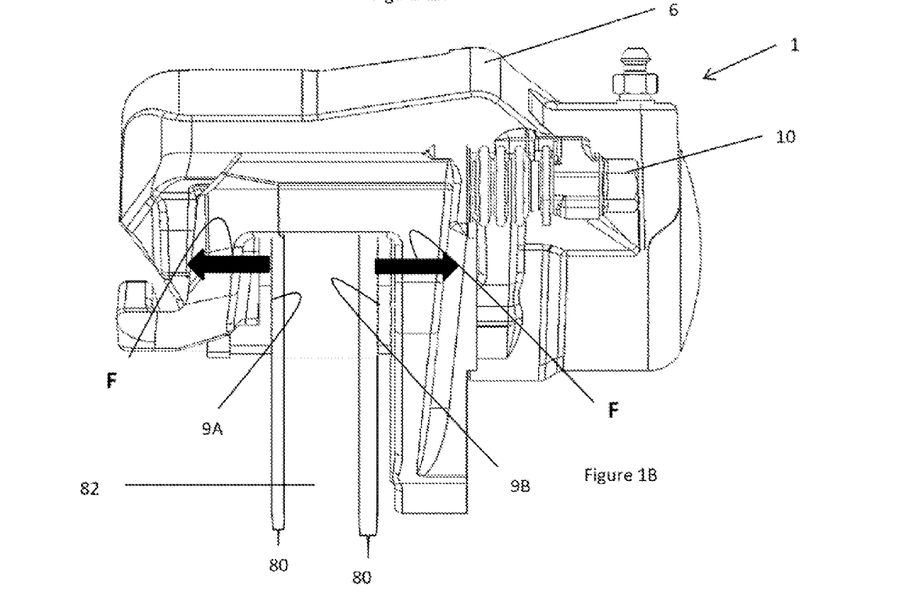
FIG. 1B illustrates a side view of a brake system having an air gap.
Figure 2A:
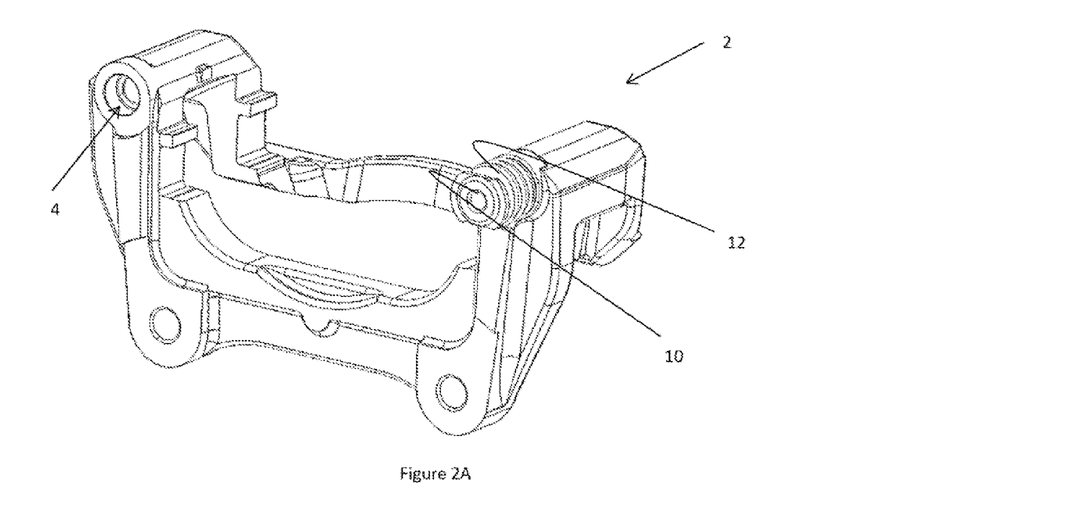
FIG. 2A illustrates a perspective view of a support bracket including a pin in one pin bore and the caliper, brake pads, and rotor removed.

FIG. 1B illustrates the brake system 1 during running. The faces 9A and 9B of the respective brake pads are separated from the rotor 82 by an air gap 80. The brake pads even with an air gap may move in the direction of the arrows and create a force (F) against the brake pads moving 8 that the caliper 6 in the direction of the force (F), and the pin caps (not shown) easily move and provide no reactionary movement so that the caliper once moved remains static during running and a substantially constant air gap 80 is maintained. As shown, plane 9A and plane 9B of the brake pads are parallel so that uneven brake pad wear, disc thickness variation (DTV), lateral run out (LRO), or a combination thereof are minimized and/or eliminated FIG. 2A illustrates a perspective view of FIG. 1A with the caliper and brake pads removed. The support bracket 2 includes pin bores 4. As illustrated, a pin 10 is extended into one of the pin bores 4. A bushing 12 is located between the pin 10 and a support bracket 2 so that debris are prevented from entering the pin bore 4.

Figure 2B:
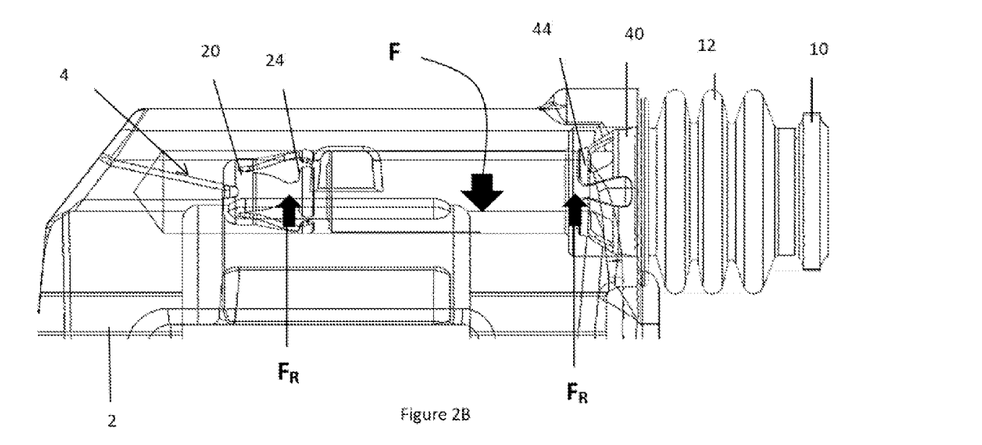
FIG. 2B illustrates close up side view of a support bracket including a pin.

FIG. 2B illustrates a side view of a support bracket 2 with the support bracket 2 being transparent so that the pin 10 and pin caps 16 are visible in the pin bore 4. The pin caps 16 as shown are an end cap 20 and a bushing cap 40. The bushing cap 40 includes a plurality of springing arms 44 that extend out and position the pin 10 within the pin bore 4. The end cap 20 also includes a plurality of spring arms 24 that extend out and position the pin 10 within the pin bore 4. The bushing 12 is located between an end of the pin 10 and the bushing cap 40 to prevent debris from entering into the pin bore 4. As illustrated a force (F) is being applied to the pin 10 and the pin caps 16 producing a reactionary force ($F_R$) that resists movement of the pin and maintains the pin 10 substantially centered in the pin bore 4.

Figure 3:
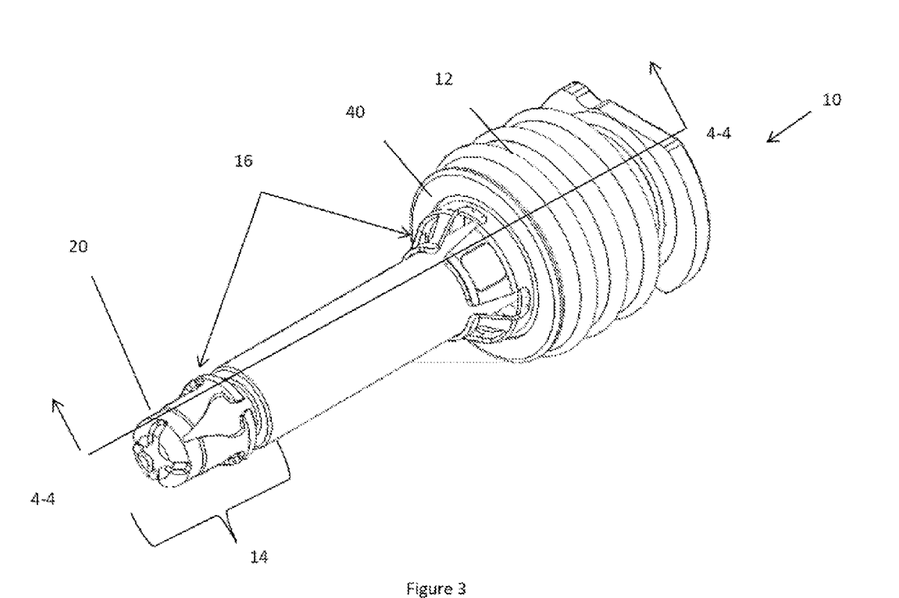
FIG. 3 illustrates an example of a pin including two pin caps.

FIG. 3 illustrates a perspective view of a pin 10 including a pair of pin caps 16. The pin 10 extends through a bushing 12 that is in communication with a busing cap 40. An end cap 20 extends around an end region 14 of the pin 10 and assists in aligning the pin 10 within a pin bore (not shown).

Figure 4:
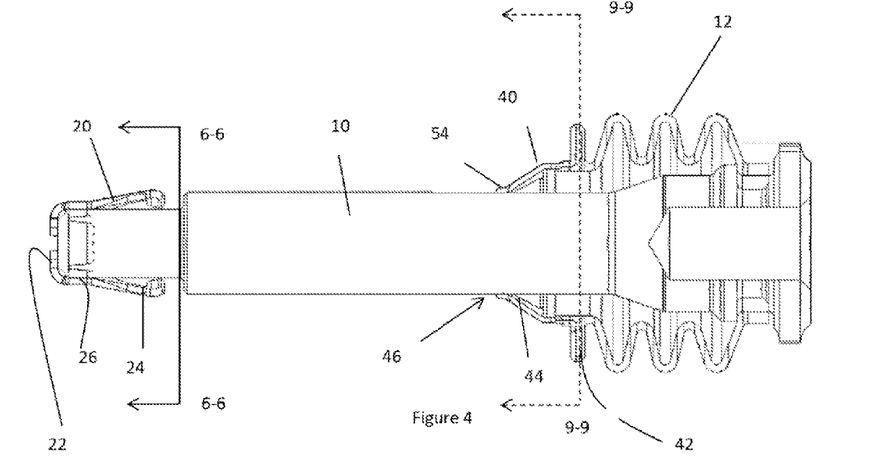
FIG. 4 illustrates a cross-section of the pin and pin caps of FIG. 3 along line 4-4.

FIG. 4 is a cross sectional view of FIG. 3 along lines 4-4. The pin 10 extends through a bushing 12 that is in communication with a bushing cap 40 via the bushing arms 42 so that the bushing 12 and bushing cap 40 move with one another. The bushing cap 40 includes a plurality of springing arms 44 that extend towards and into contact with the pin 10 and in a contact region 46. The tips 54 of the spring arms 44 after the contact region 46 curve away from the pin 10. The end cap 20 includes a plurality of gripping arms 22 that assist in forming a connection between the pin 10 and the end cap 20. A plurality of springing arms 24 extend from the gripping arms 22 and assist in maintaining the pin 10 aligned within a pin bore (not shown). The springing arms 24 have a contact region 26 where contact is formed when the springing arms 24 are deflected into contact with the pin 10.

Figure 5:
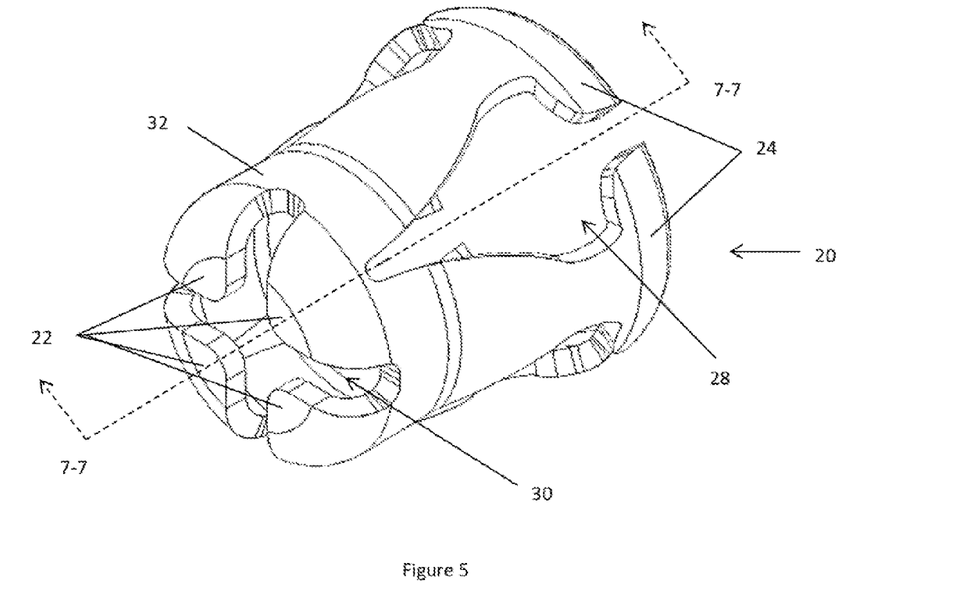
FIG. 5 illustrates one possible example of an end cap.

FIG. 5 illustrates a perspective view of an end cap 20. The end cap 20 includes a central portion 32 having a plurality of gripping arms 22 extending from the central portion 32 that are separated by a gripping region 30 so that when a pin (not shown) is placed in the end cap 20 the gripping region 30 allows the gripping arms 22 to separate and form a connection with an end region of the pin (not shown). The end cap 20 includes a plurality of springing arms 24 that are separated by deformation regions 28. The springing arms 24 are angled radially outward so that the springing arms, during movement, of the pin (not shown) contact a pin bore (not shown) and bias the pin within the pin bore.

Figure 6:
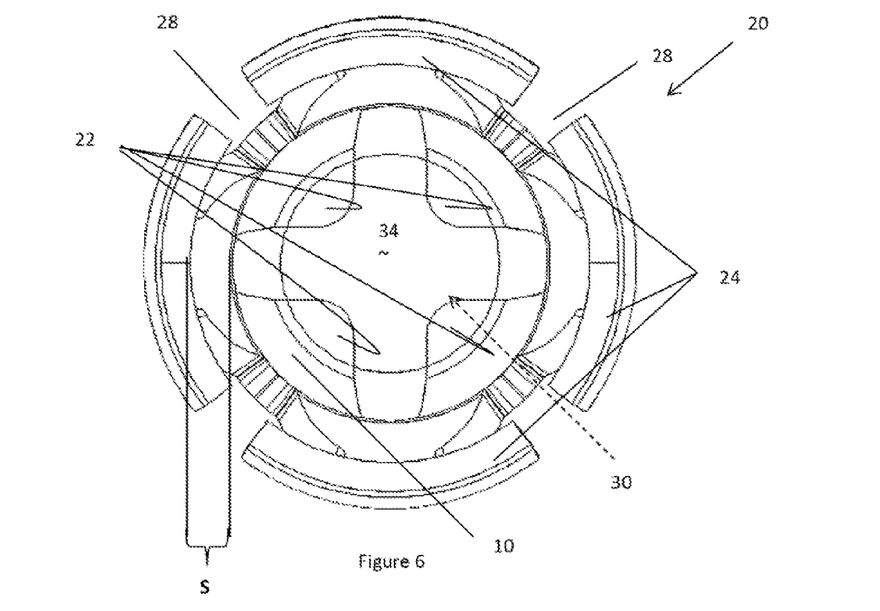
FIG. 6 illustrates a view of an end cap including a pin of FIG. 4 along line 6-6.

FIG. 6 illustrates a cross-sectional view of an end cap 20 and a pin 10 along lines 6-6 of FIG. 4. The pin 10 is shown as being transparent so that the gripping region 30 and gripping arms 22 are shown gripping the pin 10. A through hole 34 extends through a central portion 32 of the end cap 20 so that the gripping arms 22 are biasable and the end cap 10 creates a gripping force the pin 10. The springing arms 24 and deformation regions 28 extend along the pin 10 and a space (S) is located between the springing arms 24 and the pin 10 so that the springing arms 24 contact a pin bore (not shown) and align the pin 10 within the pin bore (not shown) during movement of the pin 10.

Figure 7:
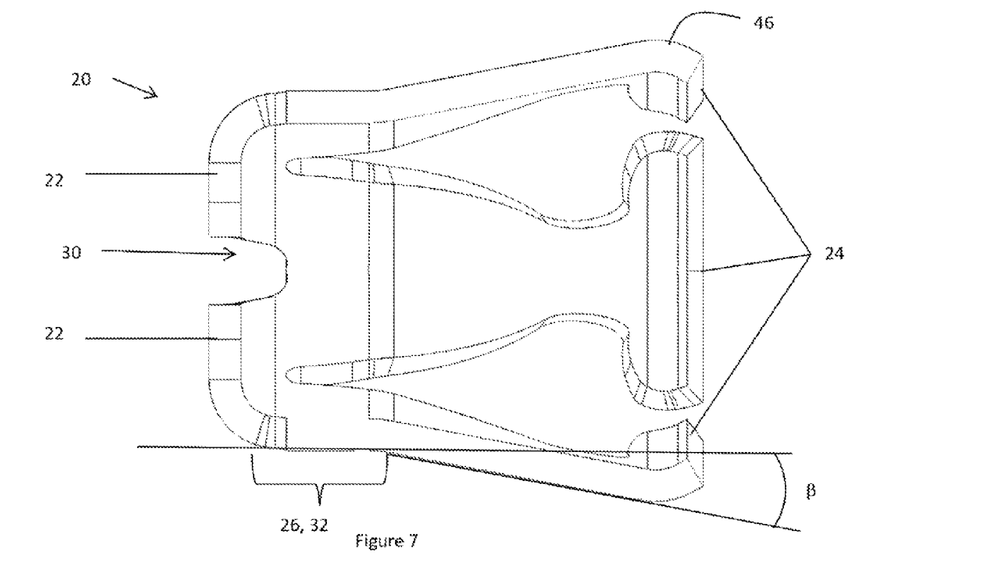
FIG. 7 illustrates a cross-sectional view of the end cap of FIG. 5 along line 7-7.

FIG. 7 illustrates a cross-sectional view of an end cap 20 along lines 7-7 of FIG. 5. The end cap 20 as shown has a contact region 26 proximate to the gripping arms 22 and the gripping regions 30 where a pin (not shown) is connected to the end cap 20. The contact region 26 as illustrated is generally commensurate with the central portion 32 of the end cap.

The end cap 20 has a plurality of springing arms 24 that extend at an angle (θ) from the contact region 26 so that the springing arms 24 align the pin (not shown) in a pin bore.

Figure 8:
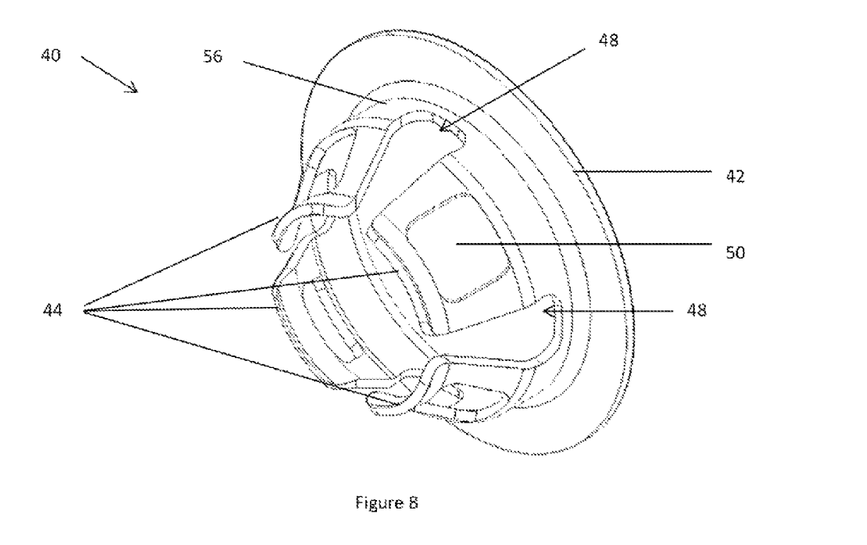
FIG. 8 illustrates a perspective view of a bushing cap.

FIG. 8 illustrates a perspective view of a bushing cap 40. The bushing cap 40 includes a central portion 56 having bushing arm 42 that extends radially outward so that communication is formed between the bushing arm 42 and a bushing (not shown) so that debris are prevented from entering a pin bore (not shown). A plurality of springing arms 44 having windows 50 extend axially outward from the central portion 56 so that the springing arms 44 connect the bushing cap 40 to a pin (not shown). A plurality of deforming regions 48 are located around the bushing cap 40 and form an alternating configuration with the springing arms 44 so that the springing arms 44 have a predetermined amount of flexibility.

Figure 9:
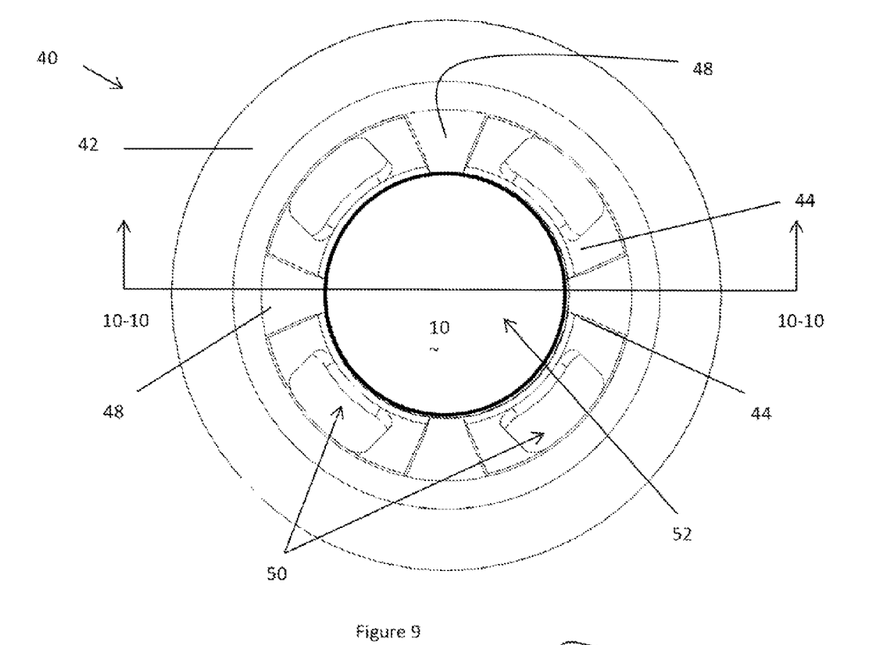
FIG. 9 illustrates an end view of a bushing cap including a pin of FIG. 4 along line 9-9.

FIG. 9 illustrates a cross-sectional end view along lines 9-9 of FIG. 4 with the bushing removed. As shown, a bushing cap 40 with a pin 10 extend through a through hole 52 in the bushing cap 40. The bushing arm 42 extends radially outward away from the pin 10 and the springing arms 44 extend axially out, relative to the pin, and radially in towards and into contact with the pin 10. The springing arms 44 include a window 50 and are in an alternating relationship with a plurality of deformation regions 48.

Figure 10:
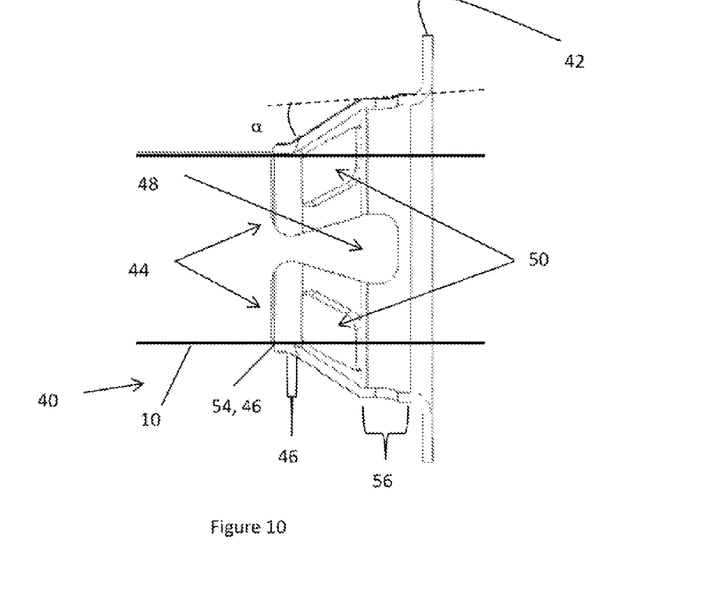
FIG. 10 illustrates a cross-sectional view of a bushing cap of FIG. 9 cut along line 10-10 with the pin removed.

FIG. 10 illustrates a cross-sectional view of FIG. 9 along lines 10-10. As illustrated, a transparent pin 10 extends through the bushing cap 40. The pin 10 and the bushing cap 40 are in contact at a contact region 46 and a tip of the spring arm 54 is angled away from the pin 10. The springing arms 44 extend at an angle (α) from a central portion 56 of the bushing cap 40 where the bushing arm 42 extends. The springing arms 44 include a window 50 and a deformation region 48 that are located between the springing arms 44 so that the springing arms bias the pin 10 during movement of the pin 10.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

We claim:
1. A pin cap comprising:
 a. a central portion including one or more through holes;
 b. one or more springing arms extending from the central portion;
 c. one or more contact regions; and
 wherein the pin cap is configured to receive a pin from a brake system so that the one or more contact regions of the pin cap contact the pin and connect the pin cap to the pin, and the one or more through holes in the central portion assist the pin cap in expanding to receive a pin so that the central portion of the pin cap creates a gripping force on the pin; and
 wherein the one or more springing arms bias the pin so that the pin and pin cap are substantially centrally located within a pin bore of the brake system.

2. The pin cap of claim 1, wherein the pin cap includes one or more gripping arms at an end of the pin cap that grip the pin to form a fixed connection, and
 wherein the one or more gripping arms prevent the pin from extending through the pin cap.

3. The pin cap of claim 2, wherein the one or more through holes are a gripping region in the end of the pin cap and the gripping region allows movement of the one or more gripping arms so that the one or more gripping arms assist in producing the gripping force to grip the pin and form a connection between the pin and the pin cap.

4. The pin cap of claim 2, wherein the gripping arms produce a gripping force in a contact region of the central portion that is located between the gripping arms and the springing arms.

5. The pin cap of claim 1, wherein the one more springing arms extend at an angle away from the central portion when the pin is in communication with the pin cap so that the spring arms bias the pin.

6. The pin cap of claim 5, wherein the angle is from about 15 degrees to about 60 degrees.

7. The pin cap of claim 1, wherein the one or more spring arms are a plurality of spring arms, and the pin cap includes a plurality of deformation regions that alternate with the plurality of spring arms around the pin cap.

8. The pin cap of claim 7, wherein the plurality of deformation regions are generally spade shaped.

9. The pin cap of claim 1, wherein the pin cap includes a bushing arm that connects the pin cap to a bushing of the brake system.

10. The pin cap of claim 9, wherein the bushing arm extend radially out from the central portion of the pin cap.

11. The pin cap of claim 1, wherein the one or more springing arms extend towards and into contact with the pin at a contact region so that the springing arms form a connection with the pin.

12. The pin cap of claim 11, wherein the one or more springing arms extend away from the pin and the connection region as the one or more springing arms extend towards the central region.

13. The pin cap of claim 1, wherein the pin cap includes one or more deformation regions and the deformation regions are located adjacent to the one or more spring arms.

14. The pin cap of claim 1, wherein the one or more springing arms include one or ore windows.

15. The pin cap of claim 1, wherein the pin extends through the one or more through holes.

16. A brake system comprising:
 a. a brake component having one or more pin bores;
 b. a pin that extends into each of the one or more pin bores; and c. one or more pin caps on each of the pins, the one or more pin caps comprising:
  i. a central portion having one or more through holes;
  ii. one or more springing arms extending from the central portion;
  iii. one or more contact regions; and
wherein the pin cap is configured to receive the pin so that the one or more contact regions of the pin cap contact the pin and connect the pin cap to the pin, and the one or more through holes in the central portion assist the pin cap in expanding to receive a pin so that the central portion of the pin cap creates a gripping force on the pin; and
wherein the one or more spring pins bias the pin so that the pin and pin cap are substantially centrally located within the pin bore.

17. The brake system of claim 16, wherein the one or more pin caps are an end cap that is located at an end of the pin that extends into the pin bore and a bushing cap that is located at a region of the pin proximate to an opening of the pin bore.

18. The brake system of claim 17, wherein the brake system includes a bushing over the pin and the bushing is connected to the bushing cap via a bushing arm and the bushing and the bushing cap prevent debris from entering the pin bore.

19. The brake system of claim 17, wherein the pin extends through at least one of the one or more through holes in the bushing cap.

20. The brake system of claim 17, wherein the one or more springing arms are a plurality of springing arms and the springing arms form a cantilever connection with the central portion.

* * * * *